(12) United States Patent
Huntsman et al.

(10) Patent No.: US 8,848,545 B1
(45) Date of Patent: Sep. 30, 2014

(54) USE OF BEARER TRAFFIC TO VALIDATE CALL RECORDS

(75) Inventors: Russell E. Huntsman, Overland Park, KS (US); Eric Bloomcamp, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1948 days.

(21) Appl. No.: 11/782,058

(22) Filed: Jul. 24, 2007

(51) Int. Cl.
*H04L 12/26* (2006.01)
*H04L 12/66* (2006.01)
*G06F 15/16* (2006.01)
*G06F 15/173* (2006.01)

(52) U.S. Cl.
USPC ........... 370/252; 370/352; 709/223; 709/224; 709/228

(58) Field of Classification Search
CPC ......... H04L 43/04; H04L 43/06; H04L 43/12; H04L 43/10; H04L 45/28; H04L 47/10; H04W 24/04; H04Q 3/0075; H04Q 3/0062
USPC ................... 370/352, 252; 709/223–224, 228
See application file for complete search history.

(56) References Cited

U.S. PATENT DOCUMENTS

| | | | | |
|---|---|---|---|---|
| 7,039,007 | B1* | 5/2006 | Abdelhamid et al. | 370/218 |
| 7,139,263 | B2 | 11/2006 | Miller et al. | |
| 7,765,294 | B2* | 7/2010 | Edwards et al. | 709/224 |
| 2001/0036176 | A1* | 11/2001 | Girard | 370/352 |
| 2002/0114321 | A1* | 8/2002 | Ogren | 370/352 |
| 2002/0156925 | A1* | 10/2002 | Suzuki | 709/249 |
| 2006/0146798 | A1* | 7/2006 | Harton et al. | 370/352 |
| 2007/0041367 | A1* | 2/2007 | Mahdi | 370/352 |

* cited by examiner

*Primary Examiner* — Asad Nawaz
*Assistant Examiner* — Wutchung Chu

(57) ABSTRACT

A system, a method and computer-readable media for monitoring the state of a call. A system is provided that includes a user device configured to send and receive voice packets over a bearer path and further configured to send and receive signaling messages over a signaling path. The system also includes a media gateway configured to communicate the voice packets to the user device over the bearer path. In addition, the media gateway is configured to monitor the bearer path and to generate status messages indicating whether the bearer path is still active. The system further includes a call agent configured to maintain a record of the call by attempting to communicate with the user device over the signaling path and by utilizing the status messages received from the media gateway.

18 Claims, 4 Drawing Sheets

USE OF BEARER TRAFFIC TO VALIDATE CALL RECORDS

CROSS-REFERENCE TO RELATED APPLICATIONS

Not applicable.

STATEMENT REGARDING FEDERALLY SPONSORED RESEARCH OR DEVELOPMENT

Not applicable.

SUMMARY

The present invention provides systems and methods for monitoring the state of a call. In one aspect of an embodiment of the present invention, a system is provided that includes a user device configured to send and receive voice packets over a bearer path and further configured to send and receive signaling messages over a signaling path. The system also includes a media gateway configured to communicate the voice packets to the user device over the bearer path. In addition, the media gateway is configured to monitor the bearer path and to generate status messages indicating whether the bearer path is still active. The system further includes a call agent configured to maintain a record of the call by attempting to communicate with the user device over the signaling path and by utilizing the status messages received from the media gateway.

In another aspect of an embodiment of the present invention, a computer-implemented method is provided for validating a record associated with a call. A bearer path is established for connecting a first end point and a second end point. The bearer path is used to communicate voice packets associated with the call between the end points. The call is monitored by utilizing signaling messages from the first end point. These signaling messages may also enable the generation of a call record. Status messages indicating whether the call is still active are received from the second end point. These status messages are generated by monitoring the bearer path and are used to validate the accuracy of the call record.

In yet another aspect of an embodiment of the present invention, a method is provided for maintaining a call in the event of a signaling failure. A bearer path is established to connect call end points. The bearer path is used to communicate voice packets associated with the call. Call activity is then monitored by exchanging signaling messaging with the first end point. Upon detecting a failure in the exchange of the signaling messages, the call is allowed to proceed despite this failure and until a message is received from the second end point indicating the bearer path is inactive.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

Figure 1:
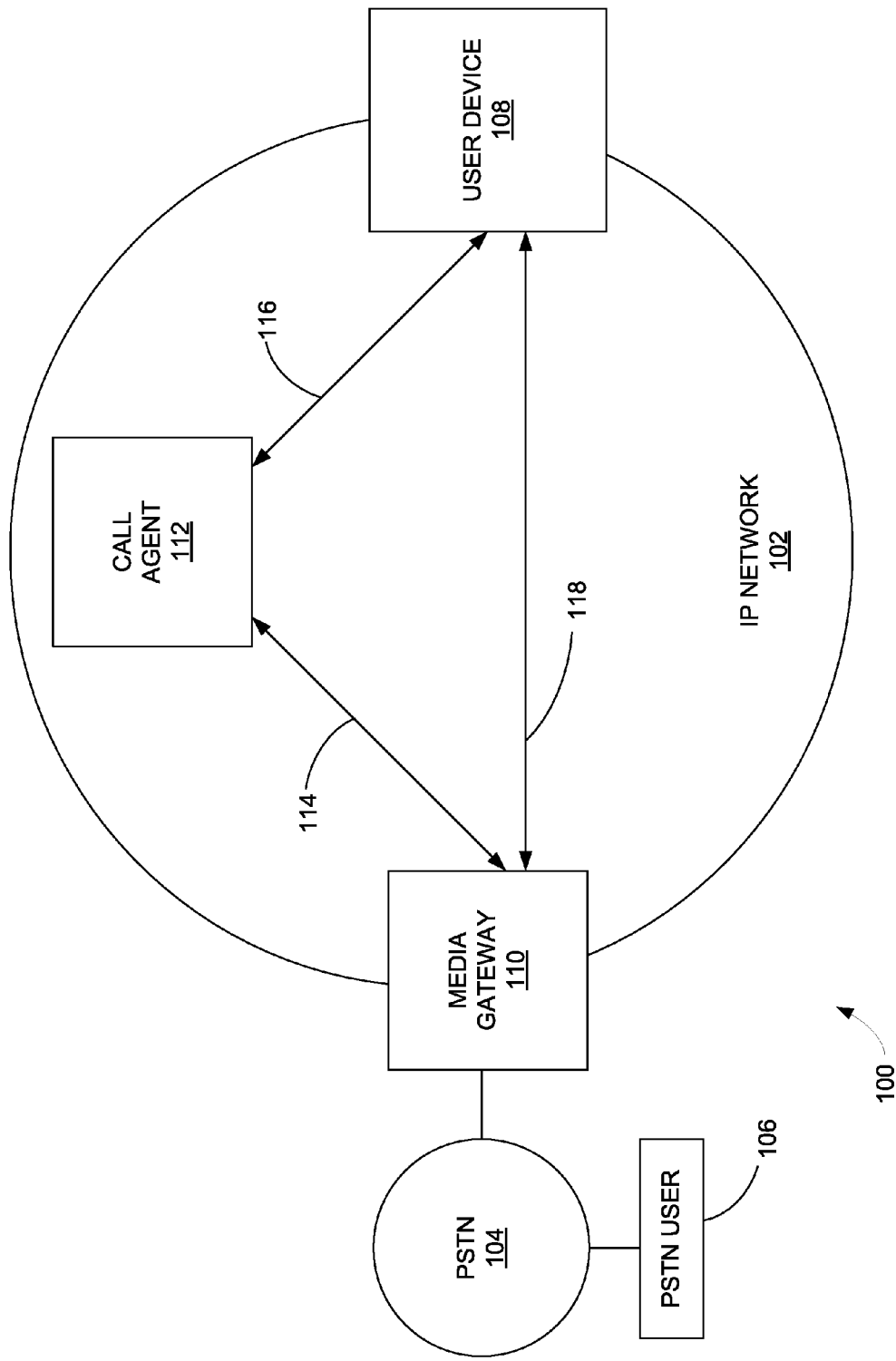
FIG. 1 is a block diagram of a network environment suitable for use in implementing the present invention.

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention relates to telecommunications system architectures and, more specifically, to Voice over Internet Protocol (VoIP) architectures. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data. Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

The present invention may be practiced in any network environment such as a communications network. Such networks are widely used to connect various types of network elements, such as routers, servers, gateways, network telephones, and so forth. Further, the invention may be practiced in a multi-network environment having various, connected public and/or private networks. The networks may be wireless or wireline ("wired"). As will be appreciated by those skilled in the art, communication networks may take several of different forms and may use several different communication protocols.

FIG. 1 illustrates a network environment 100 that represents an exemplary environment in which the present invention may be practiced. It is important to note that network environments in which the present invention may operate may be arranged in a variety of configurations, and the network environment 100 of FIG. 1 provides only one exemplary network environment.

The network environment 100 includes an IP network 102 and a Public Switched Telephone Network 104 (PSTN 104). The environment 100 may be capable of supporting the establishment of telephone calls between a PSTN user 106 and a user device 108, which is in communication with the IP network 102. The user device 108 may be any device capable of receiving and transmitting communications over the IP network 102. It may be a multi-media terminal adaptor configured to exchange signaling and media with other devices over the network 102. Alternatively, the user device 108 may be a personal computer with a broadband connection. The user device 108 may also be a mobile communication device (e.g., a cell phone), an Internet phone, a laptop computer or workstation, or a Personal Digital Assistants (PDA).

As will be appreciated by those skilled in the art, phones calls are inherently connection oriented. That is, a connection to the called entity must be established before a conversation can occur. Turning first to the establishment of a call connection over the PSTN 104, switches are the central components in a PSTN, and they are traditionally responsible for creating connections. Between the switches are trunk lines that carry the voice traffic. These links vary in data communication speed, with individual channels (DS-0s) in each link type representing one voice channel. In addition, a variety of signaling is utilized to establish a telephone call. Signaling notifies both the network and its users of important events. Examples of signaling range from telephone ringer activation to the dialing of digits used to identify a called entity. In one embodiment, the PSTN 104 may utilize Signaling System Seven (SS7) messages to establish connections, though messages formatted in accordance with any number of protocols may be employed by the PSTN 104.

Signaling in the IP network 102 is just as critical as it is in the PSTN 104. The signaling in the IP network 102 activates and coordinates the various components to complete a call. Signaling in the IP network 102 is accomplished by the exchange of IP packets or datagram messages between network components. The format for these messages may be covered by a number of standards or protocols. Regardless of the protocol or hardware components used, signaling messages are critical to the function of a voice-enabled IP network.

The connection of a call in the IP network 102 is made by two endpoints opening a communication session between each other. In a VoIP implementation, this connection is a multimedia stream (audio, video, or both) transported in real time between endpoints. This connection is referred to as the bearer (or payload) channel and represents the voice or video content being delivered. When communication is complete, the IP session is ended and network resources are released.

To establish a call that traverses both the PSTN 104 and the IP network 102, the network environment 100 includes a media gateway 110. The media gateway 110 may be responsible for call origination, call detection, and voice packet creation. In addition, the media gateway 110 may have optional features, such as data compression, echo cancellation, silence suppression, and statistics gathering. The media gateway 110 forms the interface allowing voice data to be transported to and from the PSTN 104 and across the IP network 102. In other words, the media gateway 110 is the source of bearer traffic. As will be appreciated by those in the art, media gateways exist in several forms, ranging from a dedicated telecommunication equipment chassis to a generic PC running VoIP software.

In one embodiment, each call requires an IP session in which IP packets are formatted in accordance with a Real Time Transport Protocol (RTP) running over a User Datagram Protocol (UDP). The RTP protocol provides end-to-end delivery services for data with real-time characteristics, such as interactive audio and video. These services include payload type identification, sequence numbering, time stamping, and delivery monitoring. Further, the RTP protocol provides features for real-time applications, including timing reconstruction, loss detection, content delivery, and identification of encoding schemes.

The environment 100 includes a call agent 112, which is located on the IP network 102. As will be appreciated by those skilled in the art, the call agent 112 may be considered the "switch" in the VoIP architecture. The call agent 112 may track the state of a call, as well as the resources utilized during a call. Moreover, the call agent 112 may maintain call records that may be used, e.g., for billing purposes. In one embodiment, the call agent 112 may receive SS7 signaling originating in the PSTN 104. In this embodiment, a separate signaling gateway may be utilized by the environment 100 as well.

Among other functions, the call agent 112 may be configured to locate call endpoints (e.g., the media gateway 110 and the user device 108) by referencing a database containing IP addresses and port numbers used to identify the endpoints. The call agent 112 may also manage the call-related signaling control intelligence, while the endpoints inform the call agent 112 of service events. In addition, the call agent 112 may instruct the media gateway 110 to setup and tear-down connections when calls are generated. In one embodiment, the call agent 112 informs the media gateway 110 to start an RTP session with the user device 108. The control and response sequence between the media gateway 110 and the call agent 112 may require a substantial quantity of call state data to be stored at either or both the media gateway 110 and the call agent 112.

A variety of signaling is transmitted over the IP network 102 during call set-up. As such the network 102 includes signaling paths 114 and 116. Any number of protocols may be used over these paths, including Media Gateway Control Protocol (MGCP) or Session Initiation Protocol (SIP). When an incoming call is received at the media gateway 110, the media gateway 110 notifies the call agent 112 of the call. The call agent 112 looks up the dialed phone number and directs the media gateways 110 to create a RTP connection with the user device 108 (i.e., it identifies an IP address and port number for the user device 108). The call agent 112 also informs the user device 108 of the incoming call, and the destination phone rings. Thereafter, the media gateways 110 opens an RTP session across the IP network 102 when destination phone is answered. This session yields a bearer path 118 for carrying voice packets associated with the call over the network 102.

Figure 2:
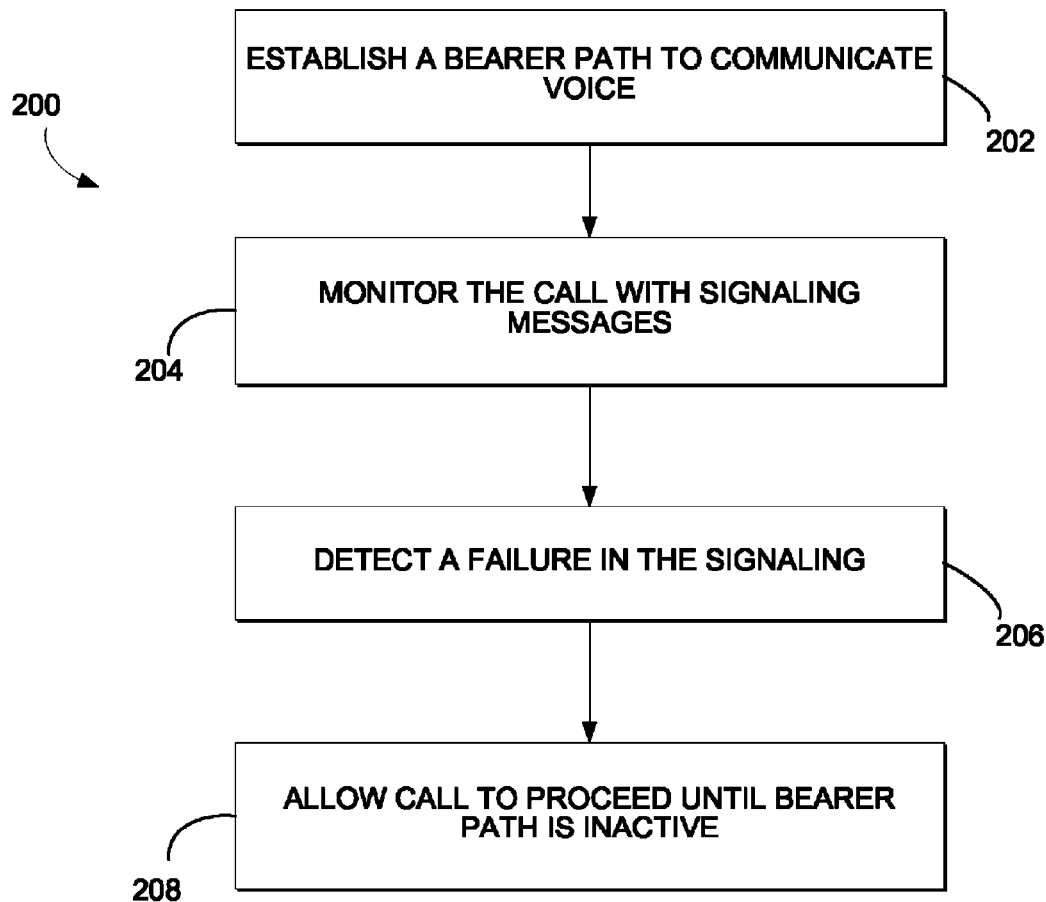
FIG. 2 illustrates a method in accordance with one embodiment of the present invention for maintaining a call in the event of a signaling failure.

FIG. 2 illustrates a method 200 for maintaining a call in the event of a signaling failure. At a step 202, a bearer path is established to communicate voice between two devices on an IP network. In one embodiment, the method 200 may be utilized in an environment such as the environment 100 of FIG. 1. For example, one or both of the devices on the bearer path may be customer premise devices configured to send and receive voice packets over an IP network, such as the Internet. The customer premise device may be an IP phone or a traditional phone connected to a terminal adaptor. Alternately, the device may be a cell phone or a computer capable of exchanging voice and signaling over the IP network.

Another type of device that may serve as a bearer path endpoint is a media gateway. As known to those in the art, a media gateway may act as a translation unit between disparate telecommunications networks. For instance, the media gateway may interface with a PSTN so as to allow voice communications to traverse both the IP network and the PSTN network. In this example, voice from a PSTN user may be packetized by the media gateway and may be transmitted over the IP network via the bearer path. In another embodiment, the media gateway may interact with a second IP network so as to facilitate the flow of voice and signaling between the two IP networks.

Those skilled in the art will appreciate that a variety of techniques exist in the art to establish a bearer path. Regardless of the types of devices that serve as endpoints, the bearer path may be established in response to signaling between devices on the IP network, including signaling originating from devices that are not actually on the bearer path. To initiate a call, a user may dial a telephone number into a communications device or a gateway may receive a PSTN message seeking to establish communications with a user on the IP network (e.g., an Initial Address Message (IAM)). Thereafter, signaling, such as SIP messages, may be communicated between the bearer path endpoints and/or one or more network call agents. This signaling may allow for the identification of the endpoints and for the exchange of the parameters necessary to establish the bearer path (e.g., the source and destination IP addresses and ports). Moreover, such signaling may also allow the exchange of other important parameters such as compression information. Once the two bearer path endpoints have the information necessary to exchange data, packetized voice associated with a phone call may be communicated over the IP network.

During the call, the method 200 attempts to monitor call activity at a step 204 by exchanging signaling messages with at least one of the bearer path endpoints. For example, a signaling path may be established between a call agent and the user's telecommunications device. Generally speaking, the call agent may be responsible for monitoring the various calls that occur over the IP network. Such monitoring may be useful for billing purposes, as well as for resource allocation. To monitor a call, the call agent may transmit messages over the signaling path to one of the call endpoints. In response to these messages, the endpoints may generate responsive signaling informing the call agent whether or not the bearer path is still active, i.e., whether the call is still in progress. Based on the contents of such messages, the call agent may maintain billing records and may continue to make network resources available for the call.

At a step 206, a failure is detected in the exchange of signaling messages between the call agent and one of the bearer path endpoints. As will be appreciated by those skilled in the art, a failure may occur for any number of different reasons. For example, a firewall may block communications from the call agent. In one embodiment, the failure is detected when the endpoint fails to respond to a signaling message within a predefined window of time. Regardless of the cause of the failure detected at the step 206, those skilled in the art will appreciate that a failure in the exchange of signaling messages may not necessary mean that the bearer path has also been compromised. Indeed, the call may still be active despite the inability of the call agent to maintain contact with the endpoint.

At a step 208, the call is allowed to proceed despite the failure in signaling and until the bearer path is inactive. In one embodiment, the call agent may seek to exchange signaling communications with a user's device as its primary means of tracking a call. In the event of a signaling failure, the call agent may attempt to monitor the call via communications with the media gateway. For instance, the media gateway may have the ability to monitor the bearer path and to send a message to delete the connection when voice packets are not observed for a predetermined duration. In response to such a message indicating an inactive bearer path, the call processor may update its call records and may cause the network resources associated with the call to be released. As will be appreciated by those skilled in the art, the method 200 leverages voice-packet monitoring by the gateway to confirm calls are still valid and prevents the tearing down of active calls that experience signaling failures.

Figure 3:
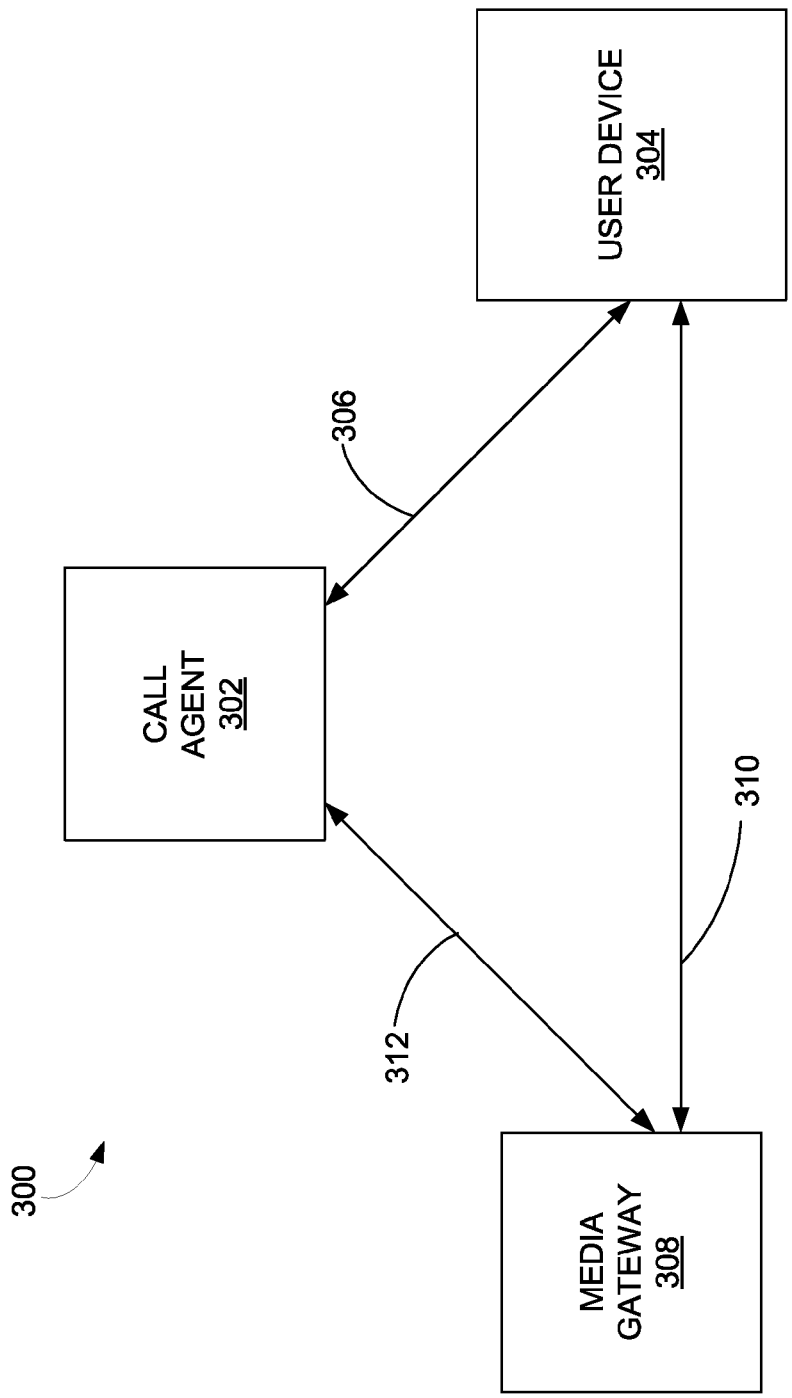
FIG. 3 is a schematic diagram representing a system for monitoring the state of a call over a VoIP architecture in accordance with one embodiment of the present invention.

FIG. 3 illustrates a system 300 for monitoring the state of a call over a VoIP architecture. The system 300 includes a call agent 302 configured to maintain a record of a call. In one embodiment, the call agent 302 may receive signaling requesting initiation of a telephone call. Such signaling may originate from a customer premise device residing on the same IP network as the call agent 302. Alternately, the signaling may originate from a PSTN or another IP network.

In response to the call-initiation signaling, the call agent 302 may identify call endpoints. As one of these endpoints, the system 300 includes a user device 304. The user device 304 may be any customer premise device configured to send and receive voice packets over an IP network. The user device 304 may also be configured to exchange signaling messages with the call agent 302 over a signaling path 306. As the other endpoint, the system 300 also includes a media gateway 308. In one embodiment, the call agent 302 informs the media gateway 308 to start an RTP session with the user device 302 so as to establish a bearer path 310. Thereafter, the media gateway 308 may monitor the status of the bearer path 310 and may periodically communicate signaling to the call agent 302 via a signaling path 312.

After the call is setup, the call agent 302 may maintain a record of the call by attempting to communicate with the user device 304 over the signaling path 306. While such communications may often provide information suitable for accurate call records, occasional signaling failures on the signaling path 306 may compromise the accuracy of such records. In the event of signaling failures, the call agent 302 may rely on status messages received from the media gateway 308 to track the call and to generate the call record. Indeed, the call agent 302 not need release the call when no response is received to a signaling message sent to an endpoint. This is because the media gateway 308 may be capable of monitoring the bearer path 310 and to send a message to delete the connection when voice packets are not observed for a configurable duration. In one embodiment, if an endpoint is unresponsive, no new calls will be sent to the endpoint. As such, new call attempts to that endpoint may be forwarded to voice mail directly until the call agent 302 receives an indication from the media gateway 308 that the call has ended. Upon receiving such an indication, the call agent 302 can update and validate billing records and can release any resources associated with the call.

Figure 4:
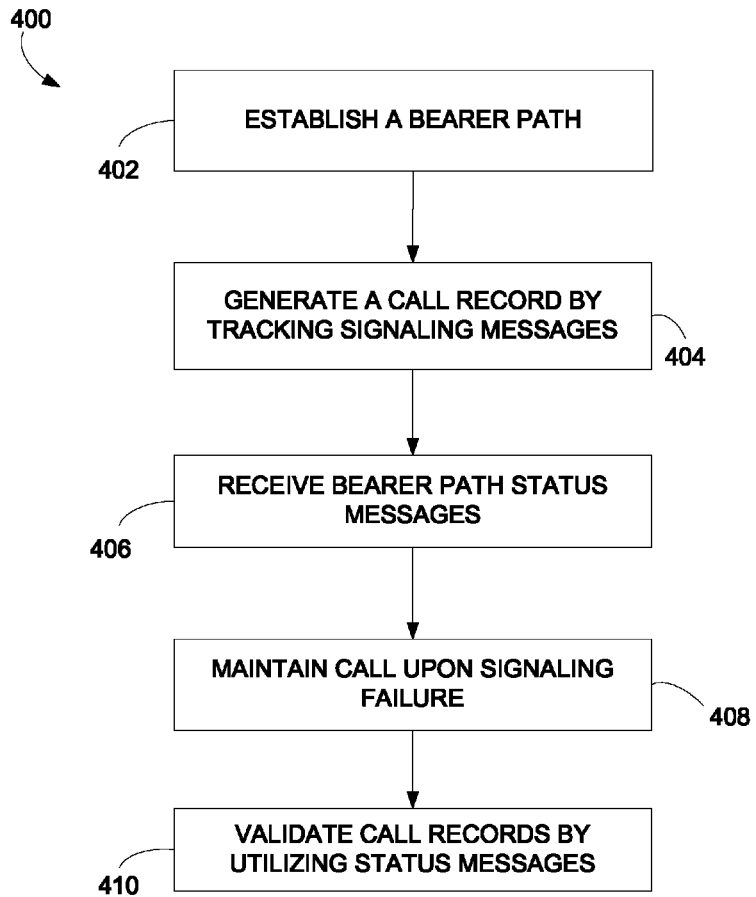
FIG. 4 illustrates a method in accordance with one embodiment of the present invention for validating a record associated with a call.

FIG. 4 illustrates a method 400 in accordance with one embodiment of the present invention for validating a record associated with a call. At 402, a bearer path is established over an IP network between a user's device and a media gateway. For example, the bearer path may be associated with a telephone call and may be used to carry RTP voice packets between the media gateway and the user's device.

To generate a call record, a call agent, at a step 404, tracks signaling messages originating from the user's device and/or a media gateway. In one embodiment, the call agent may expect periodic signaling from the user's device indicating that the call is still active. As will be appreciated by those skilled in the art, a variety of known signaling techniques may be employed by the call agent to communicate with the user's device. At a step 406, the call agent receives status messages from the media gateway. These status messages may indicate the status of the bearer path, i.e., whether voice packets continue to flow between the media gateway and the user's device.

In the event of a failure in the signaling between the user's device and the call agent, the method 400 does not tear down the call. Rather, the call is allowed to proceed until the call agent receives a status message from the media gateway indicating an inactive bearer path at a step 408. This is because a failure in signaling does not necessarily mean the call itself has failed. Thereafter, at a step 410, the accuracy of the call record is validated by utilizing the status messages from the media gateway. In this manner, the method 400 provides the ability to maintain accurate call records despite signaling failures.

Alternative embodiments and implementations of the present invention will become apparent to those skilled in the art to which it pertains upon review of the specification, including the drawing figures. For example, instead of interfacing with a PSTN, the VoIP architecture may be in communication with another IP network. In such a case, a call may traverse both IP networks. Accordingly, the scope of the present invention is defined by the appended claims rather than the foregoing description.

The invention claimed is:

1. A system for monitoring the state of a call, the system comprising:
    a user device configured to send and receive voice packets over a bearer path and further configured to send and receive signaling messages over a signaling path, wherein said voice packets are associated with said call;
    a media gateway configured to communicate said voice packets to said user device over said bearer path and further configured to generate one or more status messages indicating whether the call is still active, wherein said one or more status messages are generated by monitoring said bearer path; and
    a call agent configured to maintain a record of said call by attempting to communicate with said user device over said signaling path and by utilizing at least a portion of said one or more status messages received from said media gateway, wherein said call agent is further configured to maintain said call, despite detecting one or more failures on said signaling path, until the media gateway generates a status message indicating that the bearer path is inactive and signifying that network resources associated with said call should be released because said call has ended.

2. The system of claim 1, wherein said user device is a customer premise device connected to an Internet Protocol network.

3. The system of claim 1, wherein said media gateway receives at least a portion of said voice packets from a Public Switched Telephone Network (PSTN).

4. The system of claim 1, wherein said call agent is further configured to maintain said call despite detecting one or more failures on said signaling path.

5. The system of claim 4, wherein said call agent is further configured to utilize at least a portion of said one or more status messages to validate the accuracy of said record when said one or more failures are detected.

6. The system of claim 1, wherein said call agent is further configured to release call resources associated with said call upon receiving a message from said media gateway indicating said bearer path is inactive.

7. The system of claim 6, wherein said call agent is further configured not to release said call resources in response to a detected failure in the exchange said signaling messages.

8. The system of claim 1, wherein said user device is a mobile communications device or a terminal adaptor.

9. A computer-implemented method for validating a record associated with a call, the method comprising:
    establishing a bearer path connecting a first end point and a second end point, wherein said bearer path is used to communicate voice packets associated with said call between said first end point and said second end point, wherein a media gateway resides on said bearer path;
    monitoring said call by utilizing signaling messages from at least said first end point, wherein said monitoring enables generation of a call record;
    receiving from said media gateway one or more status messages indicating whether the bearer path is still active, wherein said one or more status messages are generated by monitoring transmission of said voice packets over said bearer path; and
    allowing said call to proceed despite a detected failure with respect to said signaling messages and until a status message is received from said media gateway indicating said bearer path is inactive, wherein said status message indicates that said call has ended and that said network resources associated with said call should be released.

10. The method of claim 9, further comprising maintaining said call despite a detected failure associated with said signaling messages.

11. The method of claim 9, wherein said voice packets are formatted in accordance with the Real-time Transport Protocol (RTP).

12. The method of claim 9, wherein said call record indicates the duration of said call.

13. One or more non-transitory computer-readable media having computer-useable instructions embodied thereon to perform a method for maintaining a call in the event of a signaling failure, the method comprising:

establishing a bearer path connecting a first end point and a second end point, wherein said bearer path is used to communicate voice packets associated with said call between said first end point and said second end point, wherein a media gateway resides on said bearer path;

attempting to monitor call activity by exchanging signaling messaging with at least said first end point;

detecting a failure in said exchanging of said signaling messaging;

allowing said call to proceed despite said failure and until a message is received from said media gateway indicating said bearer path is inactive; and incident to receiving said message indicating said bearer path is inactive, ending the call and releasing network resources associated with said call.

14. The media of claim 13, wherein said method further comprises generating a call record indicating the duration of said call.

15. The media of claim 14, wherein said generating of said call record includes utilizing said signaling messaging and said message indicating said bearer path is inactive.

16. The media of claim 13, wherein said method further comprises forwarding subsequent calls directed to said first end point to voicemail until said message is received from said second end point indicating said bearer path is inactive.

17. The media of claim 13, wherein said first end point is a user device.

18. The media of claim 17, wherein said second end point is a media gateway in communication with a Public Switched Telephone Network (PSTN) and with an Internet Protocol (IP) network.

* * * * *